Aug. 16, 1932.  H. D. GEYER  1,871,981
SPRING SHACKLE
Filed Dec. 20, 1926
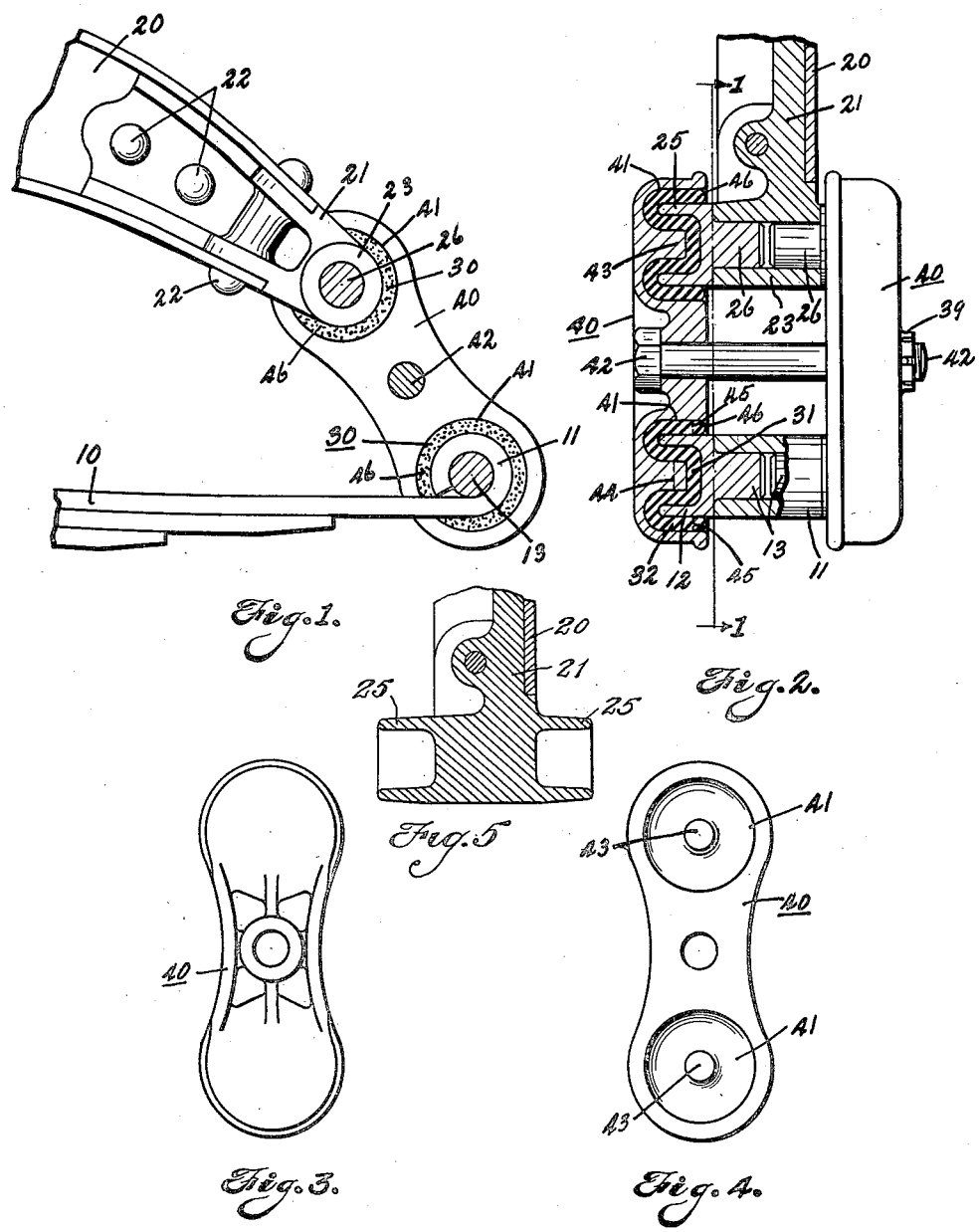
Inventor
Harvey D. Geyer
By Spencer, Hardman & Fehr
his Attorneys Patented Aug. 16, 1932

1,871,981

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

SPRING SHACKLE

Application filed December 20, 1926. Serial No. 155,802.

This invention relates to coupling members, especially such as are used as spring shackles on vehicles.

An object of this invention is to provide an improved form of rubber spring shackle which will be efficient and of long life in use and may be economically manufactured. A feature of this invention is the tortuous distortion of the elastic rubber blocks under the initial compression whereby the elastic rubber may sustain a high bearing load with a minimum amount of additional distortion due to such load.

Further objects and advantages of the present invention will be apparent from the following description, reference being had to the accompanying drawing wherein a preferred embodiment of one form of the present invention is clearly shown.

In the drawing:

Fig. 1 is a view on line 1—1 of Fig. 2 showing a shackle made according to this invention connecting the rear end of the rear spring of an automobile to the end of the chassis frame.

Fig. 2 shows in part a midsection through the shackle and in part an end elevation thereof.

Fig. 3 is a detail view showing the outer side of one of the side links.

Fig. 4 shows the opposite side of the side link of Fig. 3 with the elastic rubber blocks removed.

Fig. 5 shows a modified form of a detail.

Similar reference characters refer to similar parts throughout the drawing.

Numeral 10 designates the automobile rear semielliptic spring, the long leaf thereof having the eye 11 rolled therein. Two metal cups 12 having shanks 13 are rigidly fixed to the spring eye 11, preferably by a tight pressed fit of the shanks 13 in the eye 11. The outside diameter of the cups 12 preferably equals that of the eye 11, as clearly illustrated in Fig. 2.

The downwardly turned rear end of the chassis frame side rail 20 has the forged fitting 21 suitably fixed thereto by the bolts or rivets 22. In Figs. 1 and 2, fitting 21 is illustrated as having an eye 23 corresponding to the spring eye 11 and two metal cups 25 having shanks 26 rigidly held in said eye 23 by a tight pressed fit. However instead of fitting 21 being provided with an eye as shown, the metal cups 25 may be formed integral with the fitting 21 as clearly illustrated in Fig. 5.

Over each of the laterally extending metal cups 12 and 25 there is applied a molded elastic rubber block 30 having an inner portion 31 lying within the metal cup and an outer portion 32 surrounding the outside of the cup. The side links 40 are each provided with end recesses 41 into which the rubber blocks 30 fit snugly before the side links 40 are clamped tightly together by the cross bolt 42. At the center of each recess 41 extends a central projection 43. Before the side links 40 are drawn inward by the bolt 42, the elastic rubber of portion 31 fills the metal cup 12 up to the dotted line 44 in Fig. 2 and the annular outer portion 32 of the elastic rubber terminates approximately at the dotted line 45. Now when links 40 are drawn in against the elastic rubber blocks 30 by tightening the nut 39 of bolt 42, the rubber blocks are highly compressed as will be obvious from the drawing. During this compression the central projection 43 of the side link first engages the elastic rubber at the dotted line 44 and as the side links move inward to the position shown in Fig. 2 the rubber of the inner portion 31 is caused to flow around the lip of the metal cup 12 to the outer portion 32. This causes the outer portion 32 to bulge out beyond the dotted line 45 to a position which completely fills the annular space between the housing 41 and the metal cup, as shown at 46 in Fig. 2. It is thus seen that the elastic rubber of the inner portion 31 is distorted through a tortuous path before its compression is reduced to zero at the bulges 46, and hence the compression may be very high at the inner central portion of the rubber block even though the rubber is unconfined at the bulges 46. If desired, when the elastic rubber blocks 30 are molded in the vulcanizing molds the central portion 31 thereof may be made of such composition that it will vulcanize to a somewhat harder elastic rubber than the outer portion 32 thereof. This will permit the central portion 31 of the rubber block to sustain a greater percentage of the weight load upon the shackle and therefore reduce the tendency of the elastic rubber to bulge out at 46 further when the weight load comes upon the shackle.

In operation, the load imposed upon the shackle is sustained by the four rubber blocks 30, the bearing area upon each block being the horizontal projected area of the metal cup 12 upon the outer portion 32 plus the horizontal projected area of the central projection 43 upon the inner portion 31. As stated above, the inner portion 31 is under greater compression than the outer portion 32, and therefore the load sustained per unit area is greater on the inner portion 31 than on the outer portion 32. All the surfaces of the elastic rubber block are forced into tight non-slipping relation with the contacting metal surfaces and the pivoting of the side links 40 upon the projecting metal cups 12 and 25 is permitted by internal distortion or twist of the elastic rubber. During such pivoting, the internal twist or distortion upon the rubber of the inner portion 31 is very much less than that upon the rubber of the outer portion 32 due to its being located much closer to the axis about which the pivoting takes place. For this reason the inner portion 31 may be made of a harder elastic rubber than the outer portion 32 as described hereinabove. Side sway or lateral movement of the chassis frame relative to the spring 10 is substantially prevented by the large lateral spacing of the elastic rubber bushings 30, that is, by the lateral extension of the rubber bushings beyond the sides of the spring eye 11. It is obvious from viewing Fig. 2 that the shackle, considered as a whole, resists with a great force any lateral movement of the end of the chassis frame relative to the spring eye 11. Such lateral movement has been a troublesome defect in a great many automobile rubber spring shackles heretofore designed and it has been a special object in the design of this invention to overcome such defect.

While the form of embodiment of the present invention as herein disclosed, constitutes a preferred form, it is to be understood that other forms might be adopted, all coming within the scope of the claims which follow.

What is claimed is as follows:

1. In combination with a spring and frame member of a vehicle, a shackle comprising: an eye on the spring end, two cup members inserted into opposite sides of said eye and held rigid therein, corresponding lateral cups rigid with said frame member, four elastic rubber blocks surrounding the exterior and having a portion within the interior of said cups, two side links having end recesses encasing said rubber blocks, and means for drawing said side links together whereby said elastic rubber blocks are held under initial compression.

2. In combination with a spring and frame member of a vehicle, a shackle comprising: two laterally extending metal cups rigid with the end of said spring, two laterally extending metal cups rigid with said frame member, elastic rubber blocks surrounding the exterior and having a portion within the interior of said cups, two side links having end recesses inserted laterally over and encasing said rubber blocks, and means for clamping said side links together whereby said rubber blocks are held under initial compression.

3. In combination with a spring and frame member of a vehicle, a shackle comprising: two laterally extending metal cups rigid with the end of said spring, two laterally extending metal cups rigid with said frame member, elastic rubber blocks surrounding the exterior and having a portion within the interior of said cups, and side links connecting the upper and lower rubber blocks on each side of the shackle, said side links each having end recesses confining said blocks under compression.

4. In combination with a spring and frame member of a vehicle, a shackle comprising: two laterally extending metal cups rigid with the end of said spring, two laterally extending metal cups rigid with said frame member, elastic rubber blocks surrounding the exterior and having a portion within the interior of said cups, and side links having end recesses encasing said rubber blocks and into which said metal cups project but are held in isolated relation therewith by said blocks.

5. In combination with a spring and frame member of a vehicle, a shackle comprising: two laterally extending metal cups rigid with the end of said spring, two laterally extending metal cups rigid with said frame member, elastic rubber blocks surrounding the exterior and having a portion within the interior of said cups, and side links having end recesses encasing said rubber blocks and into which said metal cups project but are held in isolated relation therewith by said blocks, and means for clamping said side links together at their intermediate portions whereby said elastic rubber blocks are initially compressed.

6. In combination with a spring and frame member of a vehicle, a shackle comprising: two laterally extending metal cups rigid with the end of said spring, two laterally extending metal cups rigid with said frame member, elastic rubber blocks surrounding the exterior and having a portion within the interior of said cups, two side links having end recesses inserted laterally over and confining said rubber blocks under compression, said side links having central projections in said recesses which project within said metal cups but are isolated therefrom by said elastic rubber blocks.

7. An extension shackle interposed between a spring and a member supported thereby, comprising: two laterally projecting metal cups rigid with the spring end, two laterally extending metal cups rigid with said member, elastic rubber blocks inserted over each of said cups, each block having an outer portion surrounding the cup and an inner portion lying within the cup, two side links having end recesses encasing and confining said rubber blocks under compression, and means for clamping the two side links together.

8. An extension shackle interposed between a spring and a member supported thereby, comprising: two laterally projecting metal cups rigid with the spring end, two laterally extending metal cups rigid with said member, elastic rubber blocks inserted over each of said cups, each block having an outer portion surrounding the cup and an inner portion lying within the cup, two side links having end recesses encasing and confining said rubber blocks under compression, and means for clamping the two side links together, said side links having central projections within said recesses whereby the elastic rubber of the inner portion of the block is partially displaced to the outer portion thereof.

9. A pivot connection between two relatively movable members comprising: a projecting metal cup rigid with one of said members, an elastic rubber bushing encasing both the exterior and interior of said metal cup and the outer end surface thereof, a metal housing rigid with the other of said members inserted over the outside of said bushing and confining said rubber under compression.

10. A pivot connection between two relatively movable members comprising: a projecting metal cup rigid with one of said members, an elastic rubber bushing encasing both the exterior and interior of said metal cup and the outer end surface thereof, a metal housing rigid with the other of said members inserted over the outside of said bushing and confining said rubber under compression, said housing having a central projection extending within said metal cup but isolated therefrom by said rubber bushing.

In testimony whereof I hereto affix my signature.

HARVEY D. GEYER.